US012791527B2

(12) United States Patent
Shinoda et al.

(10) Patent No.: US 12,791,527 B2
(45) Date of Patent: Nov. 10, 2026

(54) INFORMATION PROCESSING DEVICE FOR AUTO SETTING DETERMINATION AREA IN IMAGE

(71) Applicant: KANADEVIA CORPORATION, Osaka (JP)

(72) Inventors: Kaoru Shinoda, Osaka (JP); Takeru Katayama, Osaka (JP); Masamitsu Abe, Osaka (JP); Ryota Ioka, Osaka (JP); Takahiro Wada, Osaka (JP); Hiroshi Hattori, Osaka (JP); Joichi Murakami, Osaka (JP); Hiroyuki Maruyama, Osaka (JP)

(73) Assignee: KANADEVIA CORPORATION, Osaka (JP)

( * ) Notice: Subject to any disclaimer, the term of this patent is extended or adjusted under 35 U.S.C. 154(b) by 188 days.

(21) Appl. No.: 18/695,234

(22) PCT Filed: Sep. 26, 2022

(86) PCT No.: PCT/JP2022/035606
§ 371 (c)(1),
(2) Date: Mar. 25, 2024

(87) PCT Pub. No.: WO2023/048271
PCT Pub. Date: Mar. 30, 2023

(65) Prior Publication Data

US 2024/0402135 A1 Dec. 5, 2024

(30) Foreign Application Priority Data

Sep. 27, 2021 (JP) ................................ 2021-156746

(51) Int. Cl.
*G01N 29/11* (2006.01)
*G06T 7/00* (2017.01)
(Continued)

(52) U.S. Cl.
CPC ............ *G01N 29/11* (2013.01); *G06T 7/0008* (2013.01); *G06V 10/25* (2022.01); *G06V 10/44* (2022.01)

(58) Field of Classification Search
None
See application file for complete search history.

(56) References Cited

U.S. PATENT DOCUMENTS

2020/0296265 A1* 9/2020 Itsuji ...................... H04N 23/90
2022/0165051 A1* 5/2022 Tokuyama ........... A22C 17/004

FOREIGN PATENT DOCUMENTS

CN 111598867 A 8/2020
CN 112539866 A 3/2021
(Continued)

OTHER PUBLICATIONS

Joseph Redmon et al., "YOLO9000: Better, Faster, Stronger" pp. 7263-pp. 7271 http://pjreddie.com/yolo9000/.
(Continued)

*Primary Examiner* — Eric S. McCall
*Assistant Examiner* — Nigel H Plumb
(74) *Attorney, Agent, or Firm* — CUSHMAN PARTNERS LLC

(57) ABSTRACT

This invention automatically sets an appropriate determination area in an image of an inspection target. An information processing device includes: a detecting section that detects, in an image of an inspection target, a feature whose positional relation with a determination area to be inspected is known; and a setting section that sets the determination area with reference to the feature detected by the detecting section.

9 Claims, 10 Drawing Sheets

(51) Int. Cl.
*G06V 10/25* (2022.01)
*G06V 10/44* (2022.01)

(56) References Cited

FOREIGN PATENT DOCUMENTS

| | | | | |
|---|---|---|---|---|
| JP | 2003-232779 | A | | 8/2003 |
| JP | 2007-280367 | A | | 10/2007 |
| JP | 2013-156104 | A | | 8/2013 |
| JP | 2014-048169 | A | | 3/2014 |
| JP | 2015021937 | A | * | 2/2015 |
| JP | 2017090346 | A | * | 5/2017 |
| JP | 2020-153975 | A | | 9/2020 |
| JP | 2020-183876 | A | | 11/2020 |
| JP | 2021-196205 | A | | 12/2021 |

OTHER PUBLICATIONS

Joseph Redmon et al., "You Only Look Once: Unified, Real-Time Object Detection", 10 pgs. http://pjreddie.com/yolo/.

International Preliminary Report on Patentability and Written Opinion of the International Searching Authority dated Apr. 2, 2024, issued in corresponding International Application No. PCT/JP2022/035606 with English translation (14 pgs.).

International Search Report dated Nov. 22, 2022, issued in corresponding International Application No. PCT/JP2022/035606 with English translation (6 pgs.).

Notice of Reasons for Refusal dated Sep. 30, 2025, issued in corresponding Japanese Patent Application No. 2021-156746 with English translation (9 pgs.).

First Office Action dated Aug. 8, 2026, issued in corresponding Chinese Patent Application No. 202280065078.4 with English machine translation (15 pgs.).

* cited by examiner

INFORMATION PROCESSING DEVICE FOR AUTO SETTING DETERMINATION AREA IN IMAGE

CROSS-REFERENCE TO RELATED APPLICATIONS

This application is the U.S. National Stage of PCT/JP2022/035606, filed Sep. 26, 2022, which claims priority to Japanese Patent Application No. 2021-156746, filed Sep. 27, 2021, the entire contents of both of which are herein incorporated by reference in their entireties.

TECHNICAL FIELD

The present invention relates to an information processing device and the like each of which sets a determination area in an image.

BACKGROUND ART

Conventionally, various kinds of determination using an image have been carried out. For example, Patent Literature 1 (presented later) discloses an ultrasonic flaw detection test using a phased array time of flight diffraction (TOFD) technique. According to this ultrasonic flaw detection test, a phased array flaw detecting element emits ultrasonic beams so that the ultrasonic beams are converged onto a stainless steel weld. Then, resulting diffracted waves are used to generate a flaw detection image, and the flaw detection image is displayed. This makes it possible to detect a weld defect occurred inside the stainless steel weld.

CITATION LIST

Patent Literature

Patent Literature 1

Japanese Patent Application Publication, Tokukai, No. 2014-048169

SUMMARY OF INVENTION

Technical Problem

According to the technique of Patent Literature 1, a weld defect is detected by visually checking the flaw detection image. Thus, the technique of Patent Literature 1 requires high labor cost and high temporal cost for an inspection. A means to solve such a problem can be, for example, automatic determination of the presence or absence of a weld defect through computer analysis of the flaw detection image.

However, the flaw detection image includes not only the echoes from the weld defect but also various other echoes and/or noises. Thus, in order to increase determination accuracy, it is desirable to first extract, as a determination area, an area in which a weld defect may possibly occur, from an image area of the flaw detection image. Further, it is desirable to extract such a determination area automatically without intermediation of a worker. This problem lies not only in the inspection for determining the presence or absence of a defect by using the flaw detection image, but is common to any inspections involving use of any images.

An aspect of the present invention has an object to realize an information processing device and the like each of which can automatically set an appropriate determination area in an image of an inspection target.

Solution to Problem

In order to solve the above problem, an information processing device in accordance with an aspect of the present invention includes: a detecting section that detects, in an image of an inspection target, a feature whose positional relation with a determination area to be inspected is known; and a setting section that sets the determination area with reference to the feature detected by the detecting section.

In order to solve the above problem, a method in accordance with an aspect of the present invention for setting a determination area is a method for setting a determination area, the method being executed by one or more information processing devices, the method including the steps of: (a) detecting, in an image of an inspection target, a feature whose positional relation with a determination area to be inspected is known; and (b) setting the determination area with reference to the feature detected in the step (a).

Advantageous Effects of Invention

In accordance with an aspect of the present invention, it is possible to automatically set an appropriate determination area in an image of an inspection target.

DESCRIPTION OF EMBODIMENTS

First Embodiment (Configuration of Device)

Figure 1:
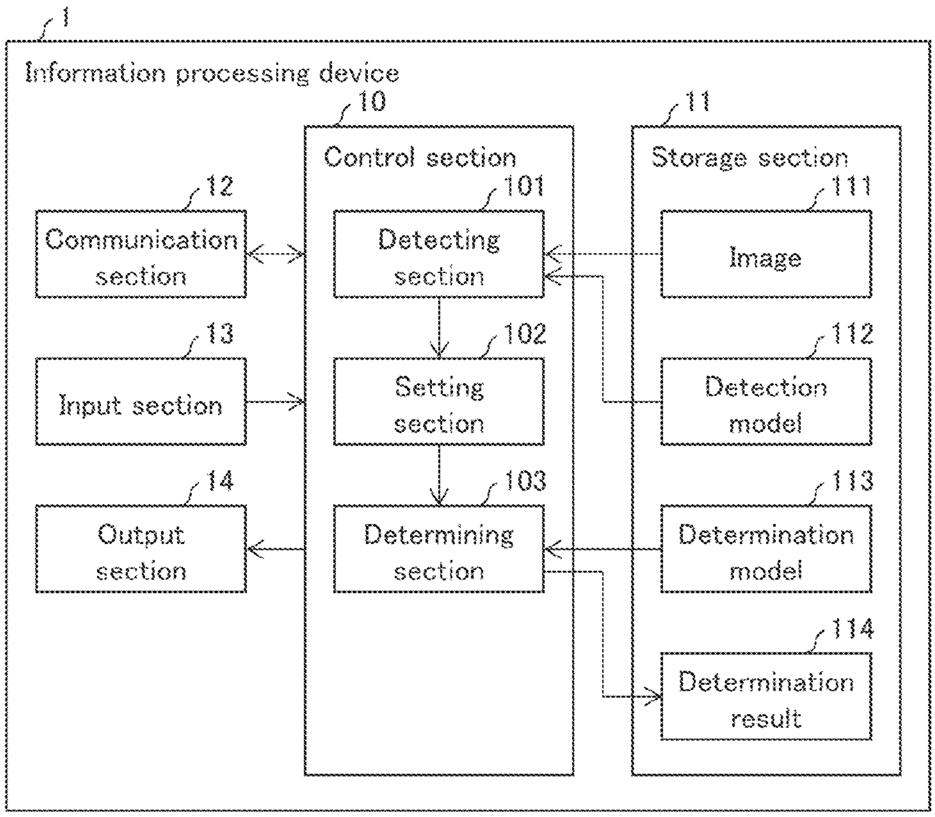
FIG. 1 is a block diagram illustrating an example of a configuration of a main part of an information processing device in accordance with a first embodiment of the present invention.

The following description will discuss, with reference to FIG. 1, a configuration of an information processing device 1 in accordance with an embodiment of the present invention. FIG. 1 is a block diagram illustrating an example of a configuration of a main part of the information processing device 1. As shown in FIG. 1, the information processing device 1 includes: a control section 10 which comprehensively controls sections of the information processing device 1; and a storage section 11 in which various data used by the information processing device 1 is stored. The information processing device 1 further includes: a communication section 12 via which the information processing device 1 communicates with another device; an input section 13 which accepts various data input into the information processing device 1; and an output section 14 via which the information processing device 1 outputs various data.

The control section 10 includes a detecting section 101, a setting section 102, and a determining section 103. The storage section 11 stores therein an image 111, a detection model 112, a determination model 113, and a determination result 114. It should be noted that the determination result 114 is stored after determination is carried out by the determining section 103.

The image 111 is an image of an inspection target. The image 111 may be selected according to the purpose, method, and/or the like of the inspection. Examples of the image 111 include an image obtained by capturing an inspection target with a generally-used optical camera, a flaw detection image used in ultrasonic testing (described later), and a computed radiography (CR) image used in radiographic testing (RT).

The image 111 has an image area which can be classified into (i) an area including at least an inspection portion (i.e., a portion to be inspected) of the inspection target and (ii) a background area thereof. Further, the image 111 includes a feature whose positional relation with a determination area is known. The information processing device 1 sets, with reference to the above-described feature, the determination area including an area including the inspection portion (details thereof will be described later).

The detection model 112 is a detection model constructed by machine learning of an appearance of a feature whose positional relation with the determination area is known. By carrying out machine learning using, as training data, an image including a determination area and a feature, it is possible to construct the detection model 112 that detects a feature included in the image 111.

It should be noted that an algorithm of the machine learning may be selected arbitrarily. For example, the detection model 112 may be a convolutional neural network model that can detect an object in an image with high accuracy. Further, the detection model 112 may be a model (e.g., You Only Look Once (YOLO)) that carries out both detection of an object and classification of the object.

The determination model 113 is a trained model for use in determination of whether an inspection target is good or defective. By carrying out machine learning using, as training data, an image of a good inspection target and an image of a defective inspection target, it is possible to construct a determination model 113 that outputs an output value indicative of whether an inspection target in an input image is good or defective. What is input into the determination model 113 is a partial image obtained by cutting a determination area from the image 111 (details thereof will be described later).

The determination result 114 is data indicative of a result of determination on the inspection target, the determination having been made by the information processing device 1. For example, in a case where the information processing device 1 determines whether the inspection target is good or defective, the determination result 114 in which identification information of the inspection target and a result of determination of whether the inspection target is good or defective is associated with each other is stored in the storage section 11.

The detecting section 101 detects, in the image 111 of the inspection target, a feature whose positional relation with the determination area is known. To be more specific, the detecting section 101 uses the detection model 112 to detect a feature in the image 111. Then, the setting section 102 sets a determination area with reference to the feature detected by the detecting section 101. Details of the detection of the feature and the setting of the determination area will be described later.

With respect to the determination area set by the setting section 102, the determining section 103 determines whether the inspection target is good or defective. Specifically, the determining section 103 cuts, from the image 111, a portion corresponding to the determination area set by the setting section 102, so as to generate a partial image. Then, the determining section 103 inputs the generated partial image into the determination model 113. Further, the determining section 103 determines, on the basis of an output value from the determination model 113, whether the inspection target is good or defective.

The determining section 103 may be any one, provided that it carries out determination with respect to a determination area set by the setting section 102. The determination method is not limited to the one described in the above example. For example, the determining section 103 may carry out determination by carrying out image analysis on the determination area. The content of the determination is not limited to determination of whether an inspection target is good or defective. Alternatively, the content of the determination may be classification of an inspection target (determination of a classification of the inspection target), for example.

As discussed above, the information processing device 1 includes: the detecting section 101 that detects, in the image 111 of the inspection target, a feature whose positional relation with a determination area to be inspected is known; and the setting section 102 that sets the determination area with reference to the feature detected by the detecting section 101.

According to the above configuration, the feature is detected in the image 111 of the inspection target, and the determination area is set with reference to the feature thus detected. Since the positional relation between the feature and the determination area to be inspected is known, it is possible to set an appropriate determination area by using this feature as a reference. Thus, the above configuration makes it possible to automatically set an appropriate determination area in an image of the inspection target.

Further, the detecting section 102 detects the feature in the image 111 with use of the detection model 112 constructed by machine learning of an appearance of the feature. This makes it possible to detect a feature having a characteristic appearance.

(Overview of System)

Figure 2:
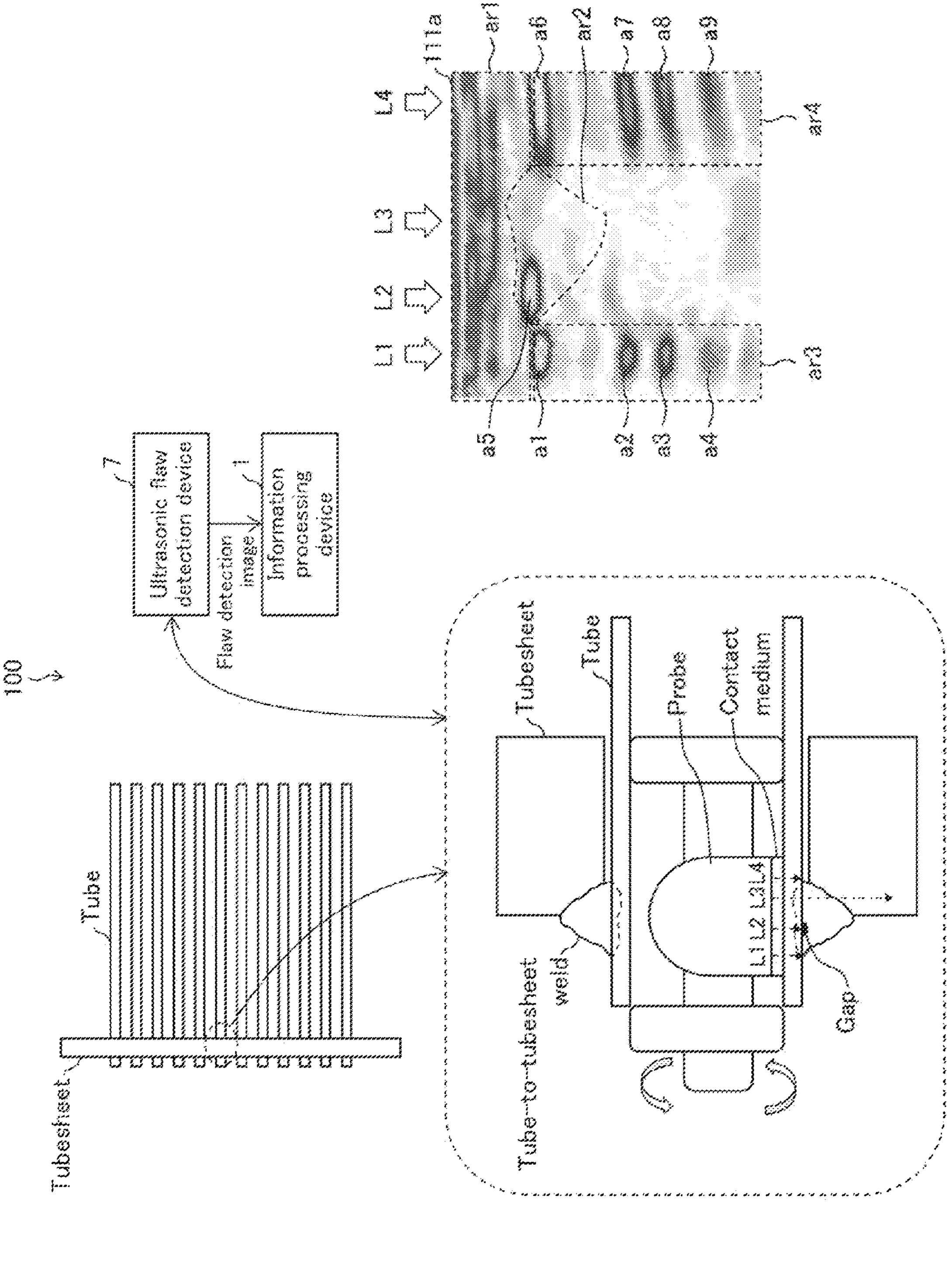
FIG. 2 is a view illustrating an overview of an inspection system including the information processing device.

The following description will discuss, with reference to FIG. 2, an overview of an inspection system in accordance with an embodiment of the present invention. FIG. 2 is a view illustrating an overview of an inspection system 100. The inspection system 100 is a system that carries out an inspection to determine the presence or absence of a defect in an inspection target on the basis of an image of the inspection target. The inspection system 100 includes the information processing device 1 and the ultrasonic flaw detection device 7.

The following description will discuss an example in which the inspection system 100 carries out an inspection to determine the presence or absence of a defect in a tube-to-tubesheet weld in a heat exchanger. The "tube-to-tubesheet weld" refers to a portion in which a plurality of metal tubes constituting the heat exchanger are welded to a metal tubesheet that bundles these tubes. The "defect in the tube-to-tubesheet weld" refers to a gap created inside the tube-to-tubesheet weld. Note that the tubes and the tubesheet may be made of a nonferrous metal such as aluminum or resin. With the inspection system 100, it is also possible to carry out an inspection to determine the presence or absence of a defect in a weld part (base weld part) between a tube support and a tube in boiler equipment used in a garbage incineration plant, for example. Needless to say, the portion to be inspected is not limited to the weld part, and the inspection target is not limited to the heat exchanger.

An inspection is carried in the following manner. As shown in an enlarged view, located in the lower left part of FIG. 2, illustrating a probe and its surroundings, a probe having a contact medium applied thereto is inserted into a tube through a tube end. Then, the probe emits ultrasonic waves so that the ultrasonic waves are propagated from an inner wall surface side of the tube toward the tube-to-tubesheet weld, and measures echoes of the ultrasonic waves thus propagated. If such a defect as a gap in the tube-to-tubesheet weld occurs, an echo from the gap can be measured. On the basis of the echo, it is possible to detect the defect.

For example, in the enlarged view, located in the lower left part of FIG. 2, illustrating the probe and its surroundings, an ultrasonic wave indicated by the arrow L3 is propagated in a portion of the tube-to-tubesheet weld which portion has no gap. Thus, an echo of the ultrasonic wave indicated by the arrow L3 would not be measured. Meanwhile, an ultrasonic wave indicated by the arrow L2 is propagated toward a portion of the tube-to-tubesheet weld which portion has a gap. Thus, an echo of the ultrasonic wave reflected by the gap is measured.

Further, an ultrasonic wave is reflected also by the periphery of the tube-to-tubesheet weld, and therefore an echo of the ultrasonic wave propagated in the periphery is also measured. For example, since an ultrasonic wave indicated by the arrow L1 is propagated in a part closer to the tube end than the tube-to-tubesheet weld is, the ultrasonic wave does not hit the tube-to-tubesheet weld but is reflected by a tube surface of the part closer to the tube end than the tube-to-tubesheet weld is. Thus, due to the ultrasonic wave indicated by the arrow L1, an echo coming from the tube surface is measured. Meanwhile, an ultrasonic wave indicated by the arrow L4 is reflected by a tube surface of a part of the tube-to-tubesheet weld which part is closer to the deeper side of the tube. Thus, the reflected echo is measured.

The tube-to-tubesheet weld surrounds the tube by 360 degrees. Thus, measurement is carried out repeatedly by circumferentially moving the probe by a certain angle (e.g., 1 degree). Then, data indicative of the measurement result obtained with the probe is transmitted to the ultrasonic flaw detection device 7. For example, the probe may be an array probe constituted by a plurality of array elements. In a case where the array probe is employed, the array probe may be disposed so that a direction of arrangement of the array elements coincides with a direction in which the tube extends. With this, it is possible to effectively inspect the tube-to-tubesheet weld whose width extends in the extending direction of the tube. Note that the array probe may be a matrix array probe constituted by array elements arranged in rows and columns.

With use of the data indicative of the result of the measurement carried out by the probe, the ultrasonic flaw detection device 7 generates an ultrasonic image that is an image of the echoes of the ultrasonic waves propagated in the tube and the tube-to-tubesheet weld. FIG. 2 illustrates a flaw detection image 111*a*, which is an example of the ultrasonic image generated by the ultrasonic flaw detection device 7. Alternatively, the information processing device 1 may generate the flaw detection image 111*a*. In this case, the ultrasonic flaw detection device 7 transmits, to the information processing device 1, the data indicative of the measurement result obtained by the probe.

In the flaw detection image 111*a*, an intensity of a measured echo is presented as a pixel value of each pixel. An image area of the flaw detection image 111*a* can be divided into a tube area ar1 corresponding to the tube, a weld area ar2 corresponding to the tube-to-tubesheet weld, and peripheral echo areas ar3 and ar4 where echoes from peripheral parts of the tube-to-tubesheet weld appear.

As discussed above, the ultrasonic wave propagated from the probe in a direction indicated by the arrow L1 is reflected by the tube surface of the part closer to the tube end than the tube-to-tubesheet weld is. This ultrasonic wave is also reflected by the inner surface of the tube. Such reflection occurs repeatedly. Thus, repeatedly generated echoes a1 to a4 appear in the peripheral echo area ar3, which extends along the arrow L1 in the flaw detection image 111*a*. The ultrasonic wave propagated from the probe in a direction indicated by the arrow L4 is repeatedly reflected by the outer surface and the inner surface of the tube. Thus, repeatedly generated echoes a6 to a9 appear in the peripheral echo area ar4, which extends along the arrow L4 in the flaw detection image 111*a*. Each of these echoes, which appear in the peripheral echo areas ar3 and ar4, is also called a "bottom echo".

The ultrasonic wave propagated from the probe in a direction indicated by the arrow L3 is not reflected by anything. Thus, no echo appears in an area extending along the arrow L3 in the flaw detection image 111*a*. Meanwhile, the ultrasonic wave propagated from the probe in a direction indicated by the arrow L2 is reflected by the gap, i.e., the defect portion in the tube-to-tubesheet weld. Thus, an echo a5 appears in an area extending along the arrow L2 in the flaw detection image 111*a*.

The information processing device 1 analyzes such a flaw detection image 111*a* to carry out an inspection to determine whether or not the tube-to-tubesheet weld is good or defective (details thereof will be described later). Specifically, a tube-to-tubesheet weld having a gap in its inside is determined as defective, whereas a tube-to-tubesheet weld having no gap is determined as good. Further, for a weld part determined as defective, the information processing device 1 may also determine a type of the defect automatically. Known as the type of the defect occurring in the tube end weld part include incomplete penetration in the first layer, incomplete fusion between welding passes, and undercut. For each type of defect, an occurrence position and an echo shape are substantially determined. Thus, it is possible to determine the type of the defect on the basis of the flaw detection image 111*a*.

(Details of Tube-to-Tubesheet Weld)

Figure 3:
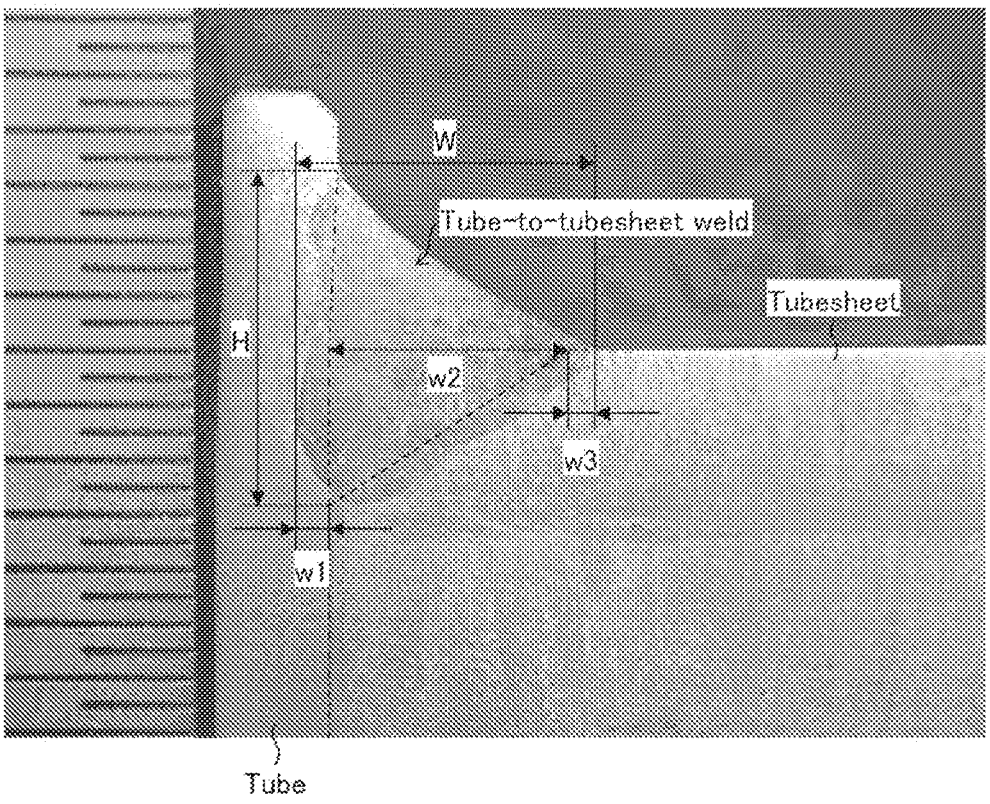
FIG. 3 is a view illustrating a cross section of a tube-to-tubesheet weld.

FIG. 3 is a view illustrating a cross section of a tube-to-tubesheet weld. When a tube and a tubesheet are welded to each other, a weld metal penetrates into the inside of the tubesheet, and also penetrates into the inside of the tube. In FIG. 3, a position of an outer surface of the tube before the welding is indicated by a dashed dotted line, and a position of a surface of the tubesheet before the welding is indicated by a broken line. As indicated by the broken line, the tubesheet in FIG. 3 has a cutout extending toward a part which is to be in contact with the tube. The cutout portion has a flat surface. Of course, the shape of the cutout portion can be selected arbitrarily. For example, the cutout portion may have a curved surface.

FIG. 3 shows that the tube-to-tubesheet weld penetrates into the inside of the tube by a width w1, and penetrates into the inside of the tubesheet by a width w3. A width w2 is a groove width. Thus, a width W of the tube-to-tubesheet weld can be expressed by (w1+w2+w3). In FIG. 3, a height of the weld part (a distance between (i) an end of the tube-to-tubesheet weld which end is closer to the tube end and (ii) an end of the tube-to-tubesheet weld which end is closer to the deeper side of the tube) is indicated by "H".

Note here that the groove width w2 is determined in advance in designing. Typically, the width (w1+w3) of penetration into the inside of the tube and the inside of the tubesheet is within a certain range (e.g., a range of 1 mm to 2 mm). Thus, the thickness W of the tube-to-tubesheet weld can be obtained through calculation carried out on the basis of a groove width and a general penetration width, even without carrying out actual measurement. The setting section 102 can set a determination area with use of the thickness W which has been calculated in advance in this manner (details thereof will be described later).

(Example of Setting of Determination Area)

Figure 4:
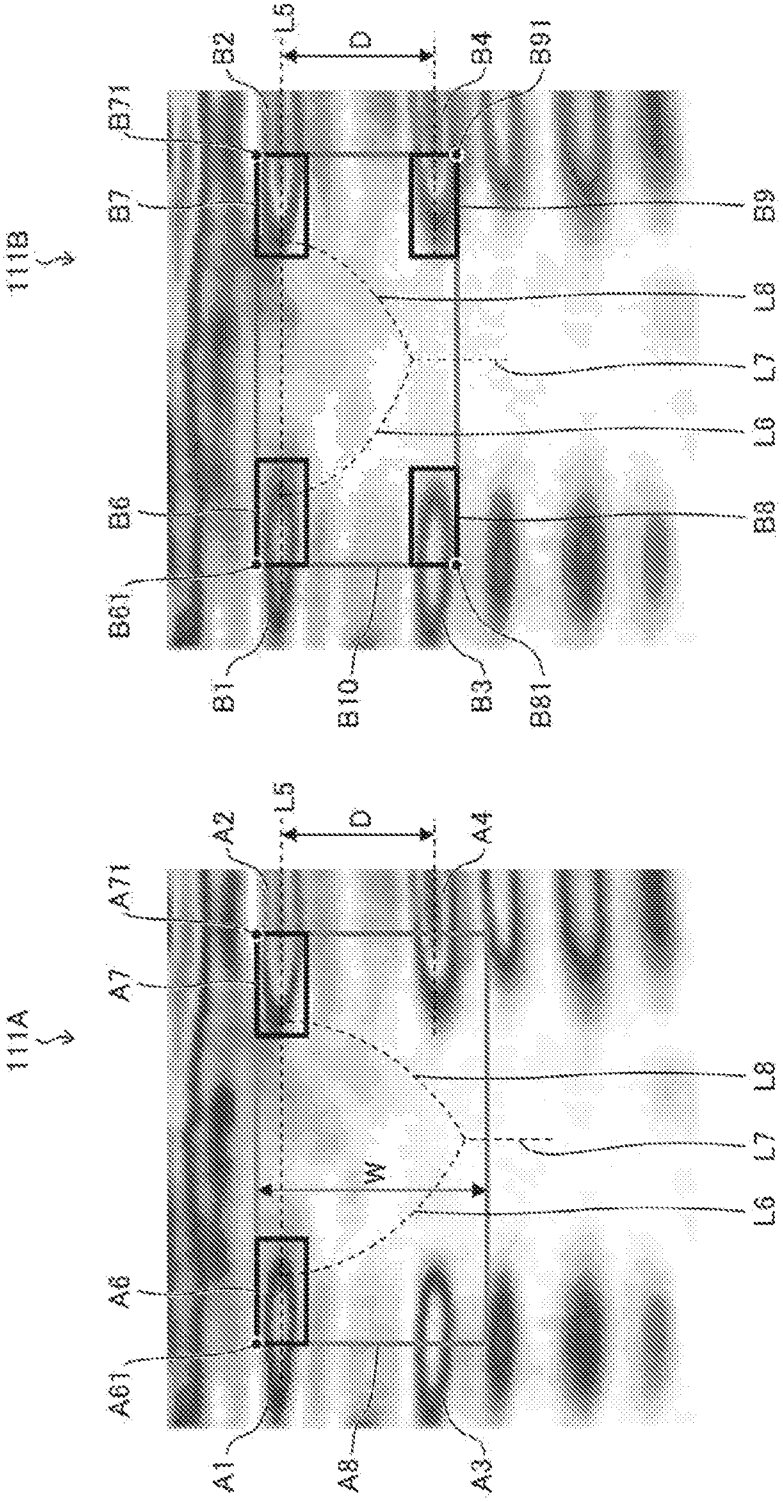
FIG. 4 is a view illustrating an example of setting a determination area.

FIG. 4 is a view illustrating an example of setting of a determination area. In FIG. 4, an image 111A is a flaw detection image of a tube-to-tubesheet weld, whereas an image 111B is a flaw detection image of another tube-to-tubesheet weld. Each of the images 111A and 111B is an image of echoes of ultrasonic waves caused to propagate in a weld part of an inspection target from a back surface thereof, the back surface being opposite to a surface in which the weld part is present.

The image 111A includes the first reflected echoes A1 and A2 coming from the tube surface and the second reflected echoes A3 and A4 coming therefrom. Each of these echoes is a bottom echo. For example, it is possible to generate such an image with use of an ultrasonic flaw detection device 7 including a linear array probe (in which elements constituting the probe are arranged in a single row).

In the image 111A, a straight line L5 passing through the first reflected echoes A1 and A2 corresponds to a position of a tube surface. A distance D from the first reflected echo A2 to the second reflected echo A4 corresponds to a thickness of the tube.

Further, in the image 111A, a curved line L6 indicates a position corresponding to a surface of the weld metal, a straight line L7 indicates a position corresponding to the tubesheet, and a curved line L8 indicates a position corresponding to a boundary between a penetration area in the tubesheet and the tubesheet. That is, an area surrounded by L5, L6, and L8 corresponds to the tube-to-tubesheet weld.

In the image 111A, a distance from the straight line L5 to ends of the curved lines L6 and L8 is longer than the distance D from the first reflected echo A2 to the second reflected echo A4. That is, this tube-to-tubesheet weld is thicker than the tube.

In this case, the detecting section 101 may detect the first reflected echoes A1 and A2 as features of the image 111A. Then, the setting section 102 may set, with reference to the first reflected echoes A1 and A2 detected by the detecting section 101, a determination area having a width which is equal to or more than the thickness W of the tube-to-tubesheet weld.

To be more specific, the detecting section 101 may input the image 111A into the detection model 112 which has been constructed by machine learning for detecting ends of the first reflected echoes A1 and A2 which ends are closer to the weld part. Consequently, a detection result indicated by rectangles A6 and A7 in FIG. 4 is obtained.

It is possible to construct the detection model 112 merely by learning the ends of the reflected echoes. Thus, a period of time and cost taken for the learning can be suppressed. The ends of the reflected echoes have similar shapes even when an ultrasonic flaw detection device 7 of a different model type and/or a different inspection target is/are used. Thus, the detection model 112 has high versatility.

Further, the setting section 102 sets, as a determination area, a rectangle area A8 having a width W and one side connecting a point A61 at the upper left end of the rectangle A6 and a point A71 at the upper right end of the rectangle A7. The value of W may be obtained by, for example, adding the penetration width on the tubesheet side and the penetration width on the tube side to the groove width, as explained with reference to FIG. 3. Further, the setting section 102 may set a determination area having a width whose value is obtained by adding a given margin to the value W calculated as above or by multiplying the value W by a given margin.

The detection model 112 for detecting the first reflected echo can be constructed by carrying out machine learning with use of training data in which an image including the first reflected echo is associated with correct data indicative of the position of the first reflected echo in the image. For example, in order to use the image 111A as training data, the image 111A may be associated with information indicative of the position and range of the rectangle A6 and information indicative of the position and range of the rectangle A7 may be associated with as correct data. The information indicative of the position and range of a rectangle may be, for example, a width, a height, and representative coordinates of the rectangle.

Meanwhile, the image 111B includes the first reflected echoes B1 and B2 coming from the tube surface and the second reflected echoes B3 and B4 coming therefrom. Each of these echoes is a bottom echo. Also in the image 111B, an area surrounded by L5, L6, and L8 corresponds to the tube-to-tubesheet weld. In the image 111B, a distance from the straight line L5 to ends of the curved lines L6 and L8 is shorter than a distance D from the first reflected echo B2 to the second reflected echo B4. That is, this tube-to-tubesheet weld is thinner than the tube.

In this case, the detecting section 101 may detect the first reflected echoes B1 and B2 and the second reflected echoes B3 and B4 as features of the image 111B. Then, the setting section 102 may set, as a determination area, an area surrounded by the first reflected echoes B1 and B2 and the second reflected echoes B3 and B4 detected by the detecting section 101.

To be more specific, the detecting section 101 may input the image 111B into the detection model 112 constructed by machine learning for detecting ends of the first reflected echoes B1 and B2 and ends of the second reflected echoes B3 and B4, the ends being closer to the weld part. Consequently, a detection result indicated by rectangles B6 and B9 in FIG. 4 is obtained. Note that the ends of the four reflected echoes (B1 to B4) which ends are closer to the weld part may be detected by respective different detection models.

Further, the setting section 102 sets, as a determination area, a rectangle area B10 defined by four apexes that are (i) a point B61 at the upper left end of the rectangle B6, (ii) a point B71 at the upper right end of the rectangle B7, (iii) a point B91 at the lower right end of the rectangle B9, and (iv) a point B81 at the lower left end of the rectangle B8. The detection model 112 for carrying out the above-described detection can be constructed by carrying out machine learning with use of training data in which an image including the first and second reflected echoes is associated with correct data indicative of the positions of the first and second reflected echoes in the image.

As discussed above, in detection involving use of a flaw detection image which is an image of echoes of ultrasonic waves caused to propagate in a weld part and its surroundings in an inspection target, the detecting section 101 may detect, as a feature, the first reflected echo among echoes of ultrasonic waves reflected in the weld part and its surroundings in the inspection target. Then, the setting section 102 may set, with reference to the first reflected echo detected by the detecting section 101, a determination area for use in determination of whether the weld part is good or defective.

The above configuration makes it possible to set an appropriate determination area for use in determination of whether the weld part is good or defective. The reason is that the reflected echoes appear in predetermined positions in an area surrounding the weld part in the flaw detection image. Note that, in the above-described example, the first reflected echoes are detected at two positions (two positions, i.e., the deeper side of the tube and the tube end side between which the weld part is sandwiched). However, if the range of the height of the weld part is known, detection of even only one of the first echoes makes it possible to set a determination area. In this case, the setting section 102 may set, with reference to the first reflected echo, a determination area having a height which is equal to or more than the height of the weld part.

As discussed above, by changing the method for setting the determination area according to whether the thickness (specified on the basis of a distance between the first and second reflected echoes) of the tube is larger or smaller than the thickness (specified on the basis of the groove width and/or the like) of the tube-to-tubesheet weld, it is possible to incorporate the whole of the tube-to-tubesheet weld into the determination area. This makes it possible to prevent a situation that the tube-to-tubesheet weld is partially outside the determination area and a defect is missed.

Detection of a feature and a determination area carried out in the above-described manner is applicable not only to an inspection of a tube-to-tubesheet weld, but is also effective to any inspection involving use of a flaw detection image which is an image of echoes of ultrasonic waves caused to propagate in a weld part and its surroundings in an inspection target.

For example, such an inspection is known that determines whether a flat-plate joint weld part is good or defective with use of a flaw detection image generated on the basis of a result of measurement carried out by causing ultrasonic waves to propagate in the joint weld part in a state where a probe is in contact with a surface of the joint weld part. For another example, such an inspection is also known that determines whether a weld part is good or defective with use of a flaw detection image generated on the basis of a result of measurement carried out by causing ultrasonic waves to enter the joint weld at an inclined angle from a base material surface which is at the same height as a surface of a weld part in the joint weld. Also in the flaw detection images for use in these inspections, the first reflected echo, resulting from an ultrasonic wave reflected in an area surrounding the weld part, appears in a given position also in an area surrounding the weld part. Therefore, it is possible to set a determination area with reference to this reflected echo.

Further, the method of setting, as a determination area, an area sandwiched between the first and second reflected echoes is applicable also to other flaw detection images than those such as the images 111A and 111B. For example, also in a flaw detection image generated on the basis of a result of measurement of echoes carried out by placing a probe onto a surface of a weld part of a flat-plate joint weld, the weld part appears in an area sandwiched between the first and second reflected echoes. This is also true of a flaw detection image generated on the basis of a result of measurement carried out by causing ultrasonic waves to enter the joint weld at an inclined angle from a base material surface which is at the same height as a surface of a weld part in the joint weld. Thus, also for these flaw detection images, the method of setting, as a determination area, an area sandwiched between the first and second reflected echoes is effective.

(Example of Setting of Determination Area: When Bottom Echo on Tube End Side does not Appear)

In a case where bottom echoes appear on both the tube end side and the deeper side of the tube in such a manner that a tube-to-tubesheet weld is sandwiched therebetween as shown in an example shown in FIG. 4, it is possible to set a determination area with reference to these bottom echoes. However, in a case where the weld part is located near the end of the tube, a bottom echo on the tube end side may not appear in some cases. The following will describe, with reference to FIGS. 5 and 6, an example of setting of a determination area in such a case.

Figure 5:
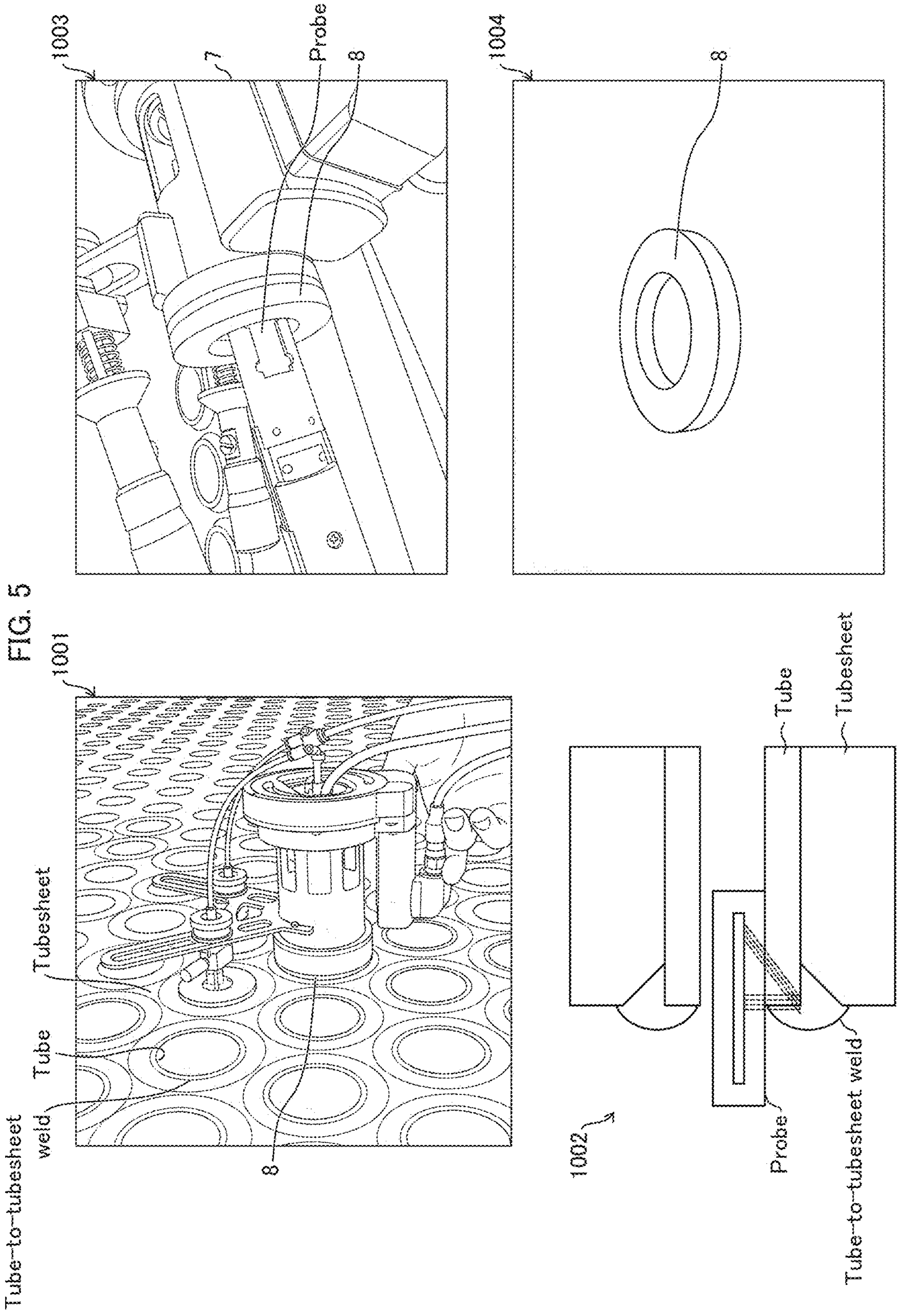
FIG. 5 is a view illustrating how an inspection is carried out on a tube having a weld part located near an end of the tube.

FIG. 5 is a view illustrating how an inspection is carried out on a tube having a weld part located near an end of the tube. In an example shown in the view 1001 of FIG. 5, a tube end and a surface of a tubesheet are on the substantially same plane, and a tube-to-tubesheet weld is also on this plane. In a case where an inspection is carried out on such a tube-to-tubesheet weld, echo measurement is carried out in a state where the propagation inhibitor 8 is attached to a position near the probe of the ultrasonic flaw detection device 7, as described below.

The view 1002 of FIG. 5 schematically illustrates how an inspection is carried out on a tube having a weld part located close to an end of the tube. Note that the propagation inhibitor 8 is not illustrated in the view 1002 of FIG. 5. As shown in the view 1002 of FIG. 5, the tube-to-tubesheet weld is formed so as to cover a groove part of the tubesheet and an end surface of the tube. Ultrasonic waves are emitted from the probe toward the tube-to-tubesheet weld. The ultrasonic waves may be emitted so that the ultrasonic waves are propagated vertically with respect to an extending direction of the tube or so that the ultrasonic waves are propagated at an inclined angle with respect to the extending direction of the tube, as shown in the view 1002 of FIG. 5.

The propagation inhibitor 8 is configured to make transmission waves of ultrasonic waves disappear or to delay propagation of the transmission wave. Examples of the propagation inhibitor 8 include rubber materials such as silicone rubber, nitrile rubber, chloroprene rubber, ethylene rubber, fluorine rubber, butyl rubber, and cyclobutyl rubber. Note that the propagation inhibitor 8 may be configured to make reflected waves of ultrasonic waves disappear or to delay propagation of the reflected waves. Alternatively, the propagation inhibitor 8 may be configured to make both the reflected waves and the transmission waves disappear. Further alternatively, the propagation inhibitor 8 may be configured to delay propagation of both the reflected waves and the transmission waves.

As shown in the views 1003 and 1004 in FIG. 5, the propagation inhibitor 8 has a ring shape. The propagation inhibitor 8 has such a diameter as to allow the propagation inhibitor 8 to be in contact with the entire periphery of the tube-to-tubesheet weld and to allow the propagation inhibitor 8 to be attached to a base portion of the probe.

When the probe of the ultrasonic flaw detection device 7 to which the propagation inhibitor 8 is attached is inserted into the inside of a tube to be inspected, the propagation inhibitor 8 comes into contact with the tube-to-tubesheet weld, as shown in the view 1001 in FIG. 5. If measurement is carried out in this state, propagation of transmission waves transmitted from the probe is delayed by the propagation inhibitor 8 at an end of the tube-to-tubesheet weld which end is closer to the tube end.

Figure 6:
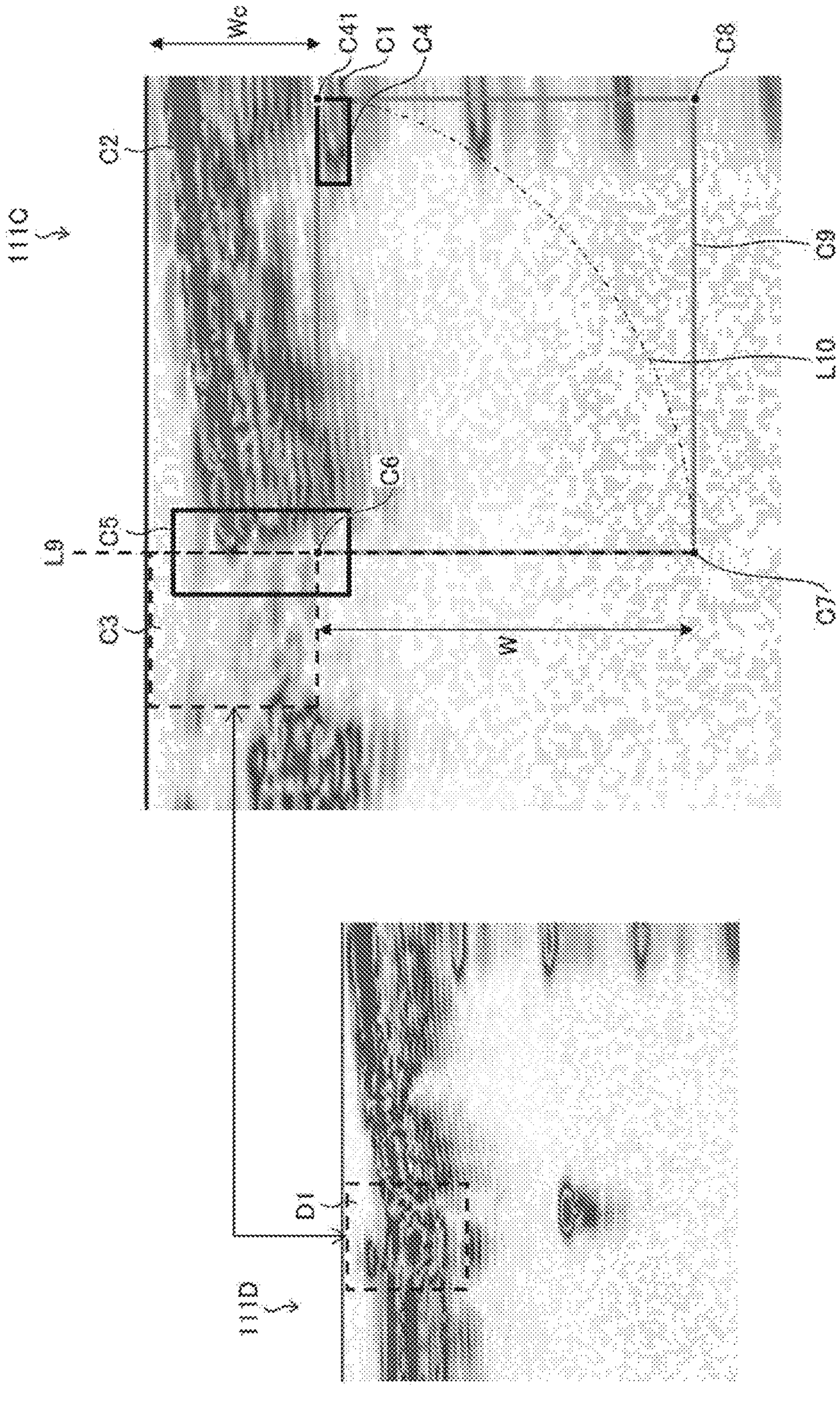
FIG. 6 is a view illustrating a flaw detection image generated by an ultrasonic flaw detection device to which a propagation inhibitor is attached.

An influence of this delay appears as a feature in a flaw detection image. Thus, the detecting section 101 can detect this feature, and the setting section 102 can set a determination area with reference to this feature. This will be described with reference to FIG. 6. FIG. 6 is a view illustrating a flaw detection image 111C generated by the ultrasonic flaw detection device 7 to which the propagation inhibitor 8 is attached. For the purpose of comparison, FIG. 6 also shows a flaw detection image 111D generated by the ultrasonic flaw detection device 7 to which the propagation inhibitor 8 is not attached.

In the flaw detection image 111C, (i) the first reflected echo C1 from the tube surface and (ii) an echo C2 including an area where a transmission wave and a reflected wave coexist and a noise can be observed. To be more specific, the echo C2 is in a part of the flaw detection image 111C, the part being located above the echo C1 and having a width Wc. Note that the right side of the flaw detection image 111C corresponds to the deeper side of the tube, whereas the left side of the flaw detection image 111C corresponds to the tube end side.

In the flaw detection image 111C, the echo C2 is interrupted. Here, an interrupted area of the echo C2 will be referred to as an "echo disappeared portion C3". As is clear from comparison between the echo disappeared portion C3 in the flaw detection image 111C and an area D1 in the flaw detection image 111D, an echo disappeared portion does not appear in the flaw detection image 111D, which is generated by the ultrasonic flaw detection device 7 to which the propagation inhibitor 8 is not attached. That is, the echo disappeared portion C3 is generated due to the presence of the propagation inhibitor 8. Thus, the position where the echo disappeared portion C3 appears corresponds to the position of the propagation inhibitor 8.

Here, as described with reference to FIG. 5, the flaw detection image 111C is generated on the basis of the result of the measurement carried out in a state where the propagation inhibitor 8 is in contact with the tube-to-tubesheet weld. Therefore, the position of the echo disappeared portion C3, which appears so as to correspond to the position of the propagation inhibitor 8, can be used as a reference for identifying the position of the tube-to-tubesheet weld. To be more specific, it can be said that a position of a boundary line L9 between the echo disappeared portion C3 and the echo C2, that is, the interrupted portion of the echo C2 indicates the position of the end of the tube-to-tubesheet weld which end is closer to the tube end.

Thus, the detecting section 101 may detect, as features of the flaw detection image 111C, the first reflected echo C1 and the end of the echo C2 which end is closer to the echo disappeared portion C3. Further, the setting section 102 may set a determination area having a width which is equal to or more than the thickness W of the tube-to-tubesheet weld, with reference to (i) the first reflected echo C1 and (ii) the end of the echo C2 which end is closer to the echo disappeared portion C3, each of which has been detected by the detecting section 101.

To be more specific, the detecting section 101 may input the flaw detection image 111C into the detection model 112 constructed by machine learning for detecting an end of the first reflected echo C1 which end is closer to the weld part and an end of the echo C2 which end is closer to the echo disappeared portion C3. Consequently, it is possible to obtain a detection result indicated by rectangles C4 and C5 in FIG. 6. Note that the end of the reflected echo C1 which end is closer to the weld part and the end of the echo C2 which end is closer to the echo disappeared portion C3 may be detected by respective different detection models.

Then, the setting section 102 sets, as a determination area, a rectangle area C9 having a width W and one side connecting a point C41 at the upper right end of the rectangle C4 and an intersection C6 at which a line segment extending leftward from the point C41 and the boundary line L9 are connected (i.e., a rectangle area defined by four apexes that are the points C41, C6, C7, and C8).

The setting section 102 may define a curved line L10 which is in the shape of a circular arc connecting the points C7 and C41, and may set a fan-shaped determination area surrounded by a line segment C6-C7, a line segment C6-C41, and the curved line L10. As shown in FIG. 3, in the weld part, the tube plate may have a cutout in some cases. This cutout portion (called a "groove portion") is filled with a weld metal. The groove portion shown in FIG. 6 is indicated by the line segments connecting the points C6, C41, and C7 in order. Further, since an area near the point C8 is located closer to the deeper side of the tube than the groove portion and corresponds to the inside of the tubesheet, eliminating the area near the point C8 makes it possible to determine an appropriately narrowed determination area.

Of course, the determination area to be set by the setting section 102 may have any shape, provided that it can be defined with reference to a feature detected by the detecting section 101. The shape of the determination area is not limited to the rectangular shape or the fan shape, but can be any shape. For example, the setting section 102 may set a triangular determination area defined by three apexes C41, C6, and C7. Not only this, the setting section 102 may set a determination area having a trapezoidal shape, a parallelogram shape, or a shape obtained by combining a plurality of kinds of shapes.

As discussed above, the flaw detection image may be an image of echoes measured in a state where the propagation inhibitor 8 for ultrasonic waves is disposed at a location adjacent to the weld part. Further, the propagation inhibitor 8 may be configured to make at least one of transmission waves of ultrasonic waves and reflected waves of ultrasonic waves disappear or to delay propagation of at least one of the transmission waves of the ultrasonic waves and the reflected waves of the ultrasonic waves. In this case, the detecting section 101 may detect, as a feature, an interrupted portion which is in the flaw detection image and in which propagation of ultrasonic waves is interrupted. Then, the setting section 102 may set a determination area with reference to the first reflected echo and the interrupted portion each of which has been detected by the detecting section 101.

As discussed above, in the flaw detection image generated on the basis of the result of the measurement carried out in a state where the propagation inhibitor for an ultrasonic wave is disposed at a location adjacent to the weld part, an interrupted portion is generated at a location corresponding to the propagation inhibitor. Thus, according to the above configuration, the interrupted portion is detected as a feature, and a determination area is set with reference to the interrupted portion and the first reflected echo. This makes it possible to set an appropriate determination area corresponding to a height (which may be rephrased as a thickness in an axial direction of the tube) of the weld part.

It should be noted that the method for detecting the interrupted portion is not limited to the above example. Alternatively, for example, the detecting section 101 may detect, on the basis of intensities of echoes in respective positions in a belt-shaped area having a width Wc corresponding to a thickness of the inspection target, an interrupted portion which is in a flaw detection image and in which propagation of ultrasonic waves is interrupted. This configuration makes it possible to detect the interrupted portion even without carrying out learning and/or the like in advance.

For example, the detecting section 101 may divide pixels constituting the above area which is in the flaw detection image 111C and which has the width Wc into rows each including pixels aligned in a single row in a lengthwise direction, and may derive, for each row, a sum of intensities of echoes corresponding to pixels in the row. Then, the detecting section 101 may detect, as an interrupted portion, a position of a row whose sum of the echo intensities is not more than a threshold or a row which immediately precedes the row whose sum of the echo intensities is not more than the threshold. In the echo disappeared portion C3, the echo intensities are significantly lower, as compared to an area where the echo C2 appears. Therefore, with this configuration, it is possible to appropriately detect the interrupted portion.

[Flow of Process]

Figure 7:
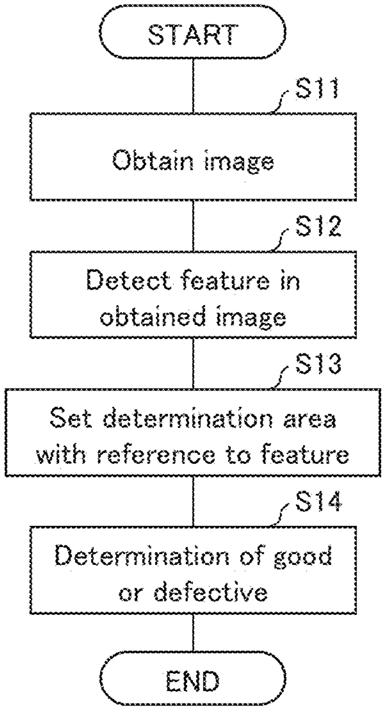
FIG. 7 is a flowchart illustrating an example of a process executed by the information processing device.

The following description will discuss, with reference to FIG. 7, a flow of a process (method for setting a determination area) to be executed by the information processing device 1. FIG. 7 is a flowchart illustrating an example of a process executed by the information processing device 1. It should be noted that, at the time of start of the process shown of this flowchart, the ultrasonic flaw detection device 7 has completed generation of a flaw detection image for a tube-to-tubesheet weld of an inspection target and the flaw detection image thus generated is stored in the storage section 11 as an image 111.

In S11, the detecting section 101 obtains the image 111, which is the flaw detection image generated for the tube-to-tubesheet weld of the inspection target. The image 111 is an image based on which determination of whether the tube-to-tubesheet weld is good or defective is made.

In S12 (detection step), the detecting section 101 determines, in the image obtained in S11, a feature whose positional relation with a determination area based on which determination of whether the tube-to-tubesheet weld is good or defective should be made is known. For example, the detecting section 101 may detect, as features, the first and second reflected echoes (at two positions, one of which is on the deeper side of the tube and the other of which is on the tube end side) coming from a tube surface of a part surrounding the tube-to-tubesheet weld. Specifically, the detecting section 101 may detect a feature on the basis of an output value obtained when the image 111 is input into the detection model 112.

In S13 (setting step), the setting section 102 sets the determination area with reference to the features detected in S12. For example, in a case where the first and second reflected echoes (at two positions, one of which is on the deeper side of the tube and the other of which is on the tube end side) coming from the tube surface of the part surrounding the tube-to-tubesheet weld are detected as the features, the setting section 102 sets, as the determination area, an area surrounded by the features at these four positions.

In S14, the determining section 103 determines whether the tube-to-tubesheet weld in the image 111 obtained in S11 is good or defective. Specifically, the determining section 103 may cut, from the image 111, a portion corresponding to the determination area set in S13, and may determine whether the tube-to-tubesheet weld is good or defective on the basis of an output value obtained when the cut image is input into the determination model 113. Then, the determining section 103 stores a result of the determination of whether the tube-to-tubesheet weld is good or defective in the storage section 11 as a determination result 114. Then, the process shown in FIG. 7 is ended.

As discussed above, the method, executed by the information processing device 1, for setting the determination area, includes: the detection step (S12) of detecting, in the image 111 of the inspection target, a feature whose positional relation with the determination area to be inspected is known; and the setting step (S13) of setting the determination area with reference to the feature detected in the detection step. According to this setting method, it is possible to automatically set an appropriate determination area in an image of an inspection target.

Second Embodiment

The following description will discuss another embodiment of the present invention. For convenience of description, a member having a function identical to that of a member discussed in the foregoing embodiment is given an identical reference sign, and a description thereof is omitted. This applies also to a third embodiment and embodiments following thereto.

Figure 8:
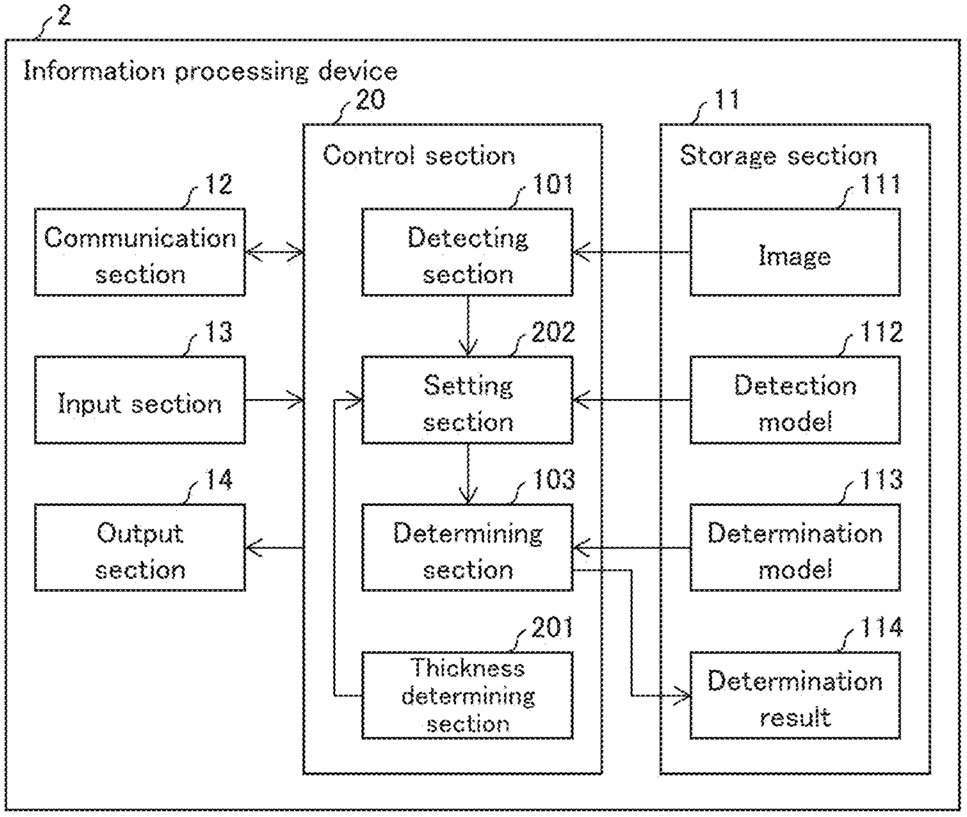
FIG. 8 is a block diagram illustrating an example of a configuration of a main part of an information processing device in accordance with a second embodiment of the present invention.

The description in the present embodiment will discuss an information processing device 2 that automatically switch, according to which of an inspection target and a weld part is thicker, a method for setting a determination area. FIG. 8 is a block diagram illustrating an example of a configuration of a main part of the information processing device 2. The information processing device 2 includes a control section 20. The control section 20 includes a thickness determining section 201. The information processing device 2 includes a setting section 202 in place of the setting section 102 described in the first embodiment.

The thickness determining section 201 determines which of an inspection target and a weld part is thicker. For example, in a case where the inspection target is a welded tube and a weld part thereof is a tube-to-tubesheet weld located at a tube end of the tube, the thickness determining section 201 determines which of the tube and the tube-to-tubesheet weld is thicker.

There is no particular limitation on a method for determining which of the inspection target and the weld part is thicker. For example, as discussed above, a groove width, which gives an influence on a thickness of the tube-to-tubesheet weld, is set in designing, and a thickness of the tube is also set in advance. Thus, the thickness determining section 201 may obtain these designed values by, e.g., causing a user to input the values via the input section 13. Then, the thickness determining section 201 may calculate a thickness of the tube-to-tubesheet weld on the basis of the obtained designed value of the groove width, and may determine which of the calculated value and the obtained designed value of the tube thickness is higher.

The detecting section 101 determines, as features, the first and second reflected echoes among echoes of ultrasonic waves reflected in the weld part and its surroundings in the inspection target. This detection is carried out with use of the detection model 112.

If the thickness determining section 201 determines that the thickness of the inspection target is equal to or more than the thickness of the weld part, the setting section 202 sets, as a determination area, an area sandwiched between the first reflected echo and the second reflected echo.

Meanwhile, if the thickness determining section 201 determines that the thickness of the inspection target is less than the thickness of the weld part, the setting section 202 sets, with reference to the first reflected echo, a determination area having a width which is equal to or more than the thickness of the weld part. For example, this width may be calculated on the basis of a sum of a penetration width on the tube side, a groove width, and a penetration width on the tubesheet side, similarly to the first embodiment.

As discussed above, in a case where the thickness of the inspection target is equal to or more than the thickness of the weld part, the information processing device 2 sets, as a determination area, an area sandwiched between the first reflected echo and the second reflected echo. Since a distance between the first reflected echo and the second reflected echo is substantially equal to the thickness of the inspection target, the determination area thus set includes the weld part.

According to the above configuration, in a case where the thickness of the inspection target is less than the thickness of the weld part, a determination area having a width which is equal to or more than the thickness of the weld part is set with reference to the first reflected echo. This makes it possible to set the determination area covering the entire weld part which is thicker than the inspection target.

As discussed above, the above configuration makes it possible to automatically set a determination area having an appropriate width, either in a case where the thickness of the inspection target is equal to or more than the thickness of the weld part or in a case where the thickness of the inspection target is less than the thickness of the weld part.

It should be noted that, in a case where the weld part is located near the end of the inspection target, the detecting section 101 preferably obtains an image generated on the basis of a result of measurement carried out in a state where a propagation inhibitor for ultrasonic waves is disposed near the weld part. Further, the detecting section 101 preferably detects, as a feature, an interrupted portion which is in the image and in which propagation of ultrasonic waves is interrupted. In this case, the setting section 202 can determine, with reference to the interrupted portion, a position of an end of the determination area which end is closer to the tube end.

[Flow of Process]

Figure 9:
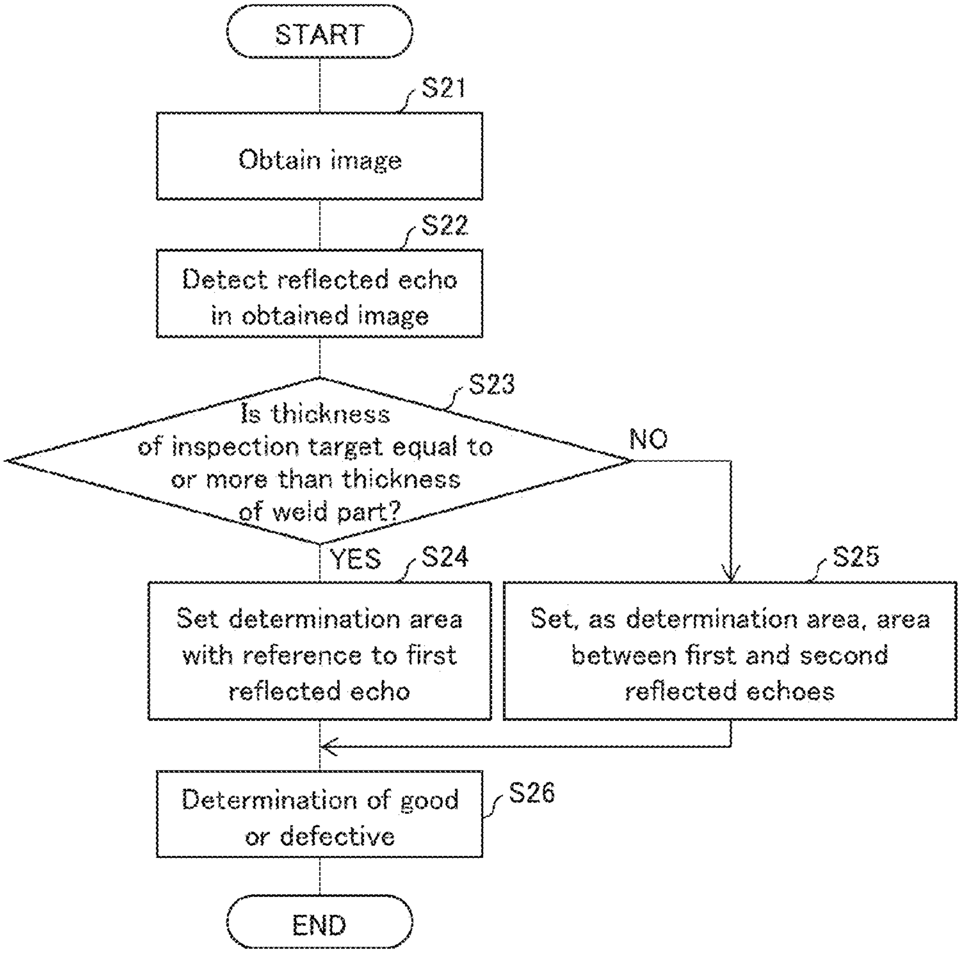
FIG. 9 is a flowchart illustrating an example of a process executed by the information processing device.

The following description will discuss, with reference to FIG. 9, a flow of a process (method for setting a determination area) to be executed by the information processing device 2. FIG. 9 is a flowchart illustrating an example of a process executed by the information processing device 2. It should be noted that S21 and S26 are respectively the same as S11 and S14 in FIG. 7. Therefore, S21 and S26 will not be described here.

In S22 (detection step), in the image 111 obtained in S21, the detecting section 101 detects, as features, the first and second reflected echoes among echoes of ultrasonic waves reflected in the weld part and its surroundings in the inspection target. Detection of these reflected echoes may be carried out with use of the detection model 112. In a case where an image 111 generated by the ultrasonic flaw detection device 7 to which the propagation inhibitor is attached is used, the detecting section 101 may detect, as features, not only the first and second reflected echoes but also an interrupted portion in which propagation of ultrasonic waves is interrupted due to the propagation inhibitor.

In S23, the thickness determining section 201 determines whether or not a thickness of the inspection target is equal to or more than a thickness of the weld part. If it is determined that the thickness of the inspection target is equal to or more than the thickness of the weld part (YES in S23), the procedure advances to S24. Meanwhile, if it is determined that the thickness of the inspection target is less than the thickness of the weld part (NO in S23), the procedure advances to S25. It should be noted that the determination of S23 may be carried out in parallel with S22 or in advance of S22.

In S24 (setting step), the setting section 202 sets a determination area having a width which is equal to or more than the thickness of the weld part, with reference to the first reflected echo among the reflected echoes detected in S22. In a case where the interrupted portion in which propagation of ultrasonic waves is interrupted due to the propagation inhibitor is detected as a feature in S22, the setting section 202 sets a determination area with reference to a straight line (L9 in FIG. 6) defined on the basis of the interrupted portion and the first reflected echo.

In S25 (setting step), the setting section 202 sets, as a determination area, an area sandwiched between the first and second reflected echoes detected in S22. In a case where the interrupted portion in which propagation of ultrasonic waves is interrupted due to the propagation inhibitor is detected as a feature in S22, the setting section 202 sets a determination area with reference to the straight line (L9 in FIG. 6) defined on the basis of the interrupted portion and the first and second reflected echoes.

Third Embodiment

Figure 10:
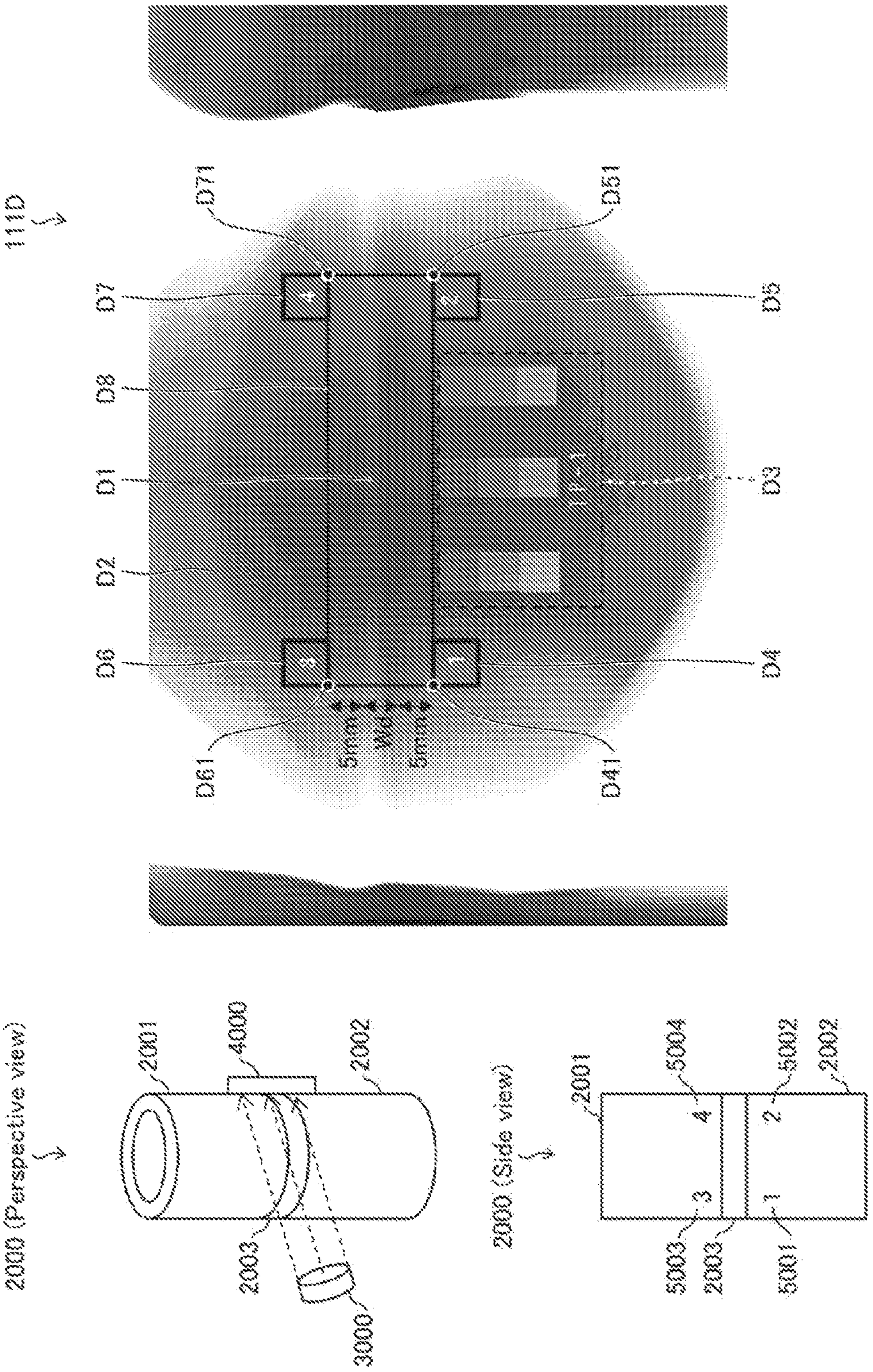
FIG. 10 is a view illustrating an example of a CR image of a joint weld part in piping, which is one example of an inspection target.

The description in the present embodiment will discuss, with reference to FIG. 10, an example in which the information processing device 1 carries out a radiographic testing (RT) of a joint weld part in piping with use of a computed radiography (CR) image. FIG. 10 is a view illustrating a configuration of piping 2000 including a joint weld part which is an example of an inspection target and a CR image 111D thereof.

FIG. 10 shows a perspective view and a side view of the piping 2000. As shown in FIG. 10, the piping 2000 includes a first tube part 2001 and a second tube part 2002 which are connected to each other via a weld part 2003. Radial rays are emitted from a RT device 3000 to the weld part 2003 of the piping 2000, and an image of radial rays having passed through the piping 2000 is generated by an imaging plate (IP) 4000. The IP 4000 is disposed such that its back side is in contact with the piping 2000. In a case where an inspection is carried out on a portion of the annularly formed weld part 2003 which portion is farther from the RT device 3000 (which portion is closer to the IP 4000), radial rays are caused to enter the annularly formed weld part 2003 at an inclined angle as shown in the perspective view of the piping 2000.

The side view of the piping 2000 shown in FIG. 10 is a side view of the piping 2000 seen from a side on which the IP 4000 is disposed. As shown in FIG. 10, the piping 2000 has four numbers 1 to 4 (5001 to 5004). These numbers are disposed so as surround an area which is in the weld part 2003 and which is to be inspected, so that these numbers can be used as a reference for setting a determination area. Such a marker can be given to the piping 2000 by, e.g., attaching a sticker(s) indicative of a number(s) thereto. Of course, the marker given to the piping 2000 is not limited to the number, and can be any one, for example, a character(s) and/or a symbol(s).

In the CR image 111D, an amount of radial rays absorbed by the inspection target is expressed by shading levels. For example, the weld part 2003 is made of a material different from those of the first tube part 2001 and the second tube part 2002, and therefore absorbs radial rays in an amount different from those of the first tube part 2001 and the second tube part 2002. Thus, in the CR image 111D, the weld part 2003 appears as an image D1 and an image D2. Since the radial rays are caused to enter the weld part at an inclined angle as described above, a half of the annular weld part 2003 closer to the RT device 3000 appears as the annular image D2 and another half of the annular weld part 2003 closer to the IP 4000 appears as the image D1 which is in the shape of a substantial straight-line. The image D1 has a width Wd.

Further, FIG. 10 shows a step wedge (film density comparison instrument) D3 superimposed on the CR image 111D. Comparing the portions of the CR image 111D with the step wedge D3 makes it possible to determine amounts of radial rays absorbed by the respective portions of the CR image 111D. It is desirable that the step wedge D3 is made of the same material as that of the piping 2000, which is a subject of examination. For example, in a case where the piping 2000 is made of austenitic stainless steel SUS304, it is desirable that the step wedge D3 is also made of SUS304.

In order to inspect the weld part with use of the CR image 111D, it is necessary to set a determination area including the image D1. In the example shown in FIG. 10, the numbers 1 to 4 in the CR image 111D are detected as features and a determination area is set with reference to these features. In FIG. 10, a detection result of the numbers 1 to 4 by the detecting section 101 is indicated by rectangles D4 to D7. In the CR image 111D, the numbers are not laterally inverted. The reason is that the IP 4000 is disposed such that its back side is in contact with the piping 2000. In FIG. 10, the determination area set by the setting section 102 is indicated by a rectangle D8. The rectangle D8 is a rectangle defined by four apexes that are an upper left apex D41 of the rectangle D4, an upper right apex D51 of the rectangle D5, a lower right apex D61 of the rectangle D6, and a lower left apex D71 of the rectangle D7.

Since the rectangle D8 includes the image D1 of the weld part, the rectangle D8 is an appropriate determination area. For an inspection to determine whether the weld part 2003 is good or defective, it is preferable to set a determination area extending to a location which is a little away from a groove end of the weld part 2003. For example, in the example shown in FIG. 10, the determination area ranges from a location which is upwardly away from, by 5 mm, an upper groove end in the image D1 of the weld part having the width Wd to a location which is downwardly away from, by 5 mm, a lower groove end of the weld part having the width Wd.

As discussed above, for an inspection target having no feature usable as an appropriate reference, a marker in an image of the inspection target may be attached to the inspection target. This makes it possible to set an appropriate determination area with reference to the marker included in the image. Further, as discussed above, the information processing device 1 is applicable not only to a nondestructive inspection involving use of ultrasonic waves described in the first embodiment but also to a nondestructive inspection involving use of radial rays.

Fourth Embodiment

Figure 11:
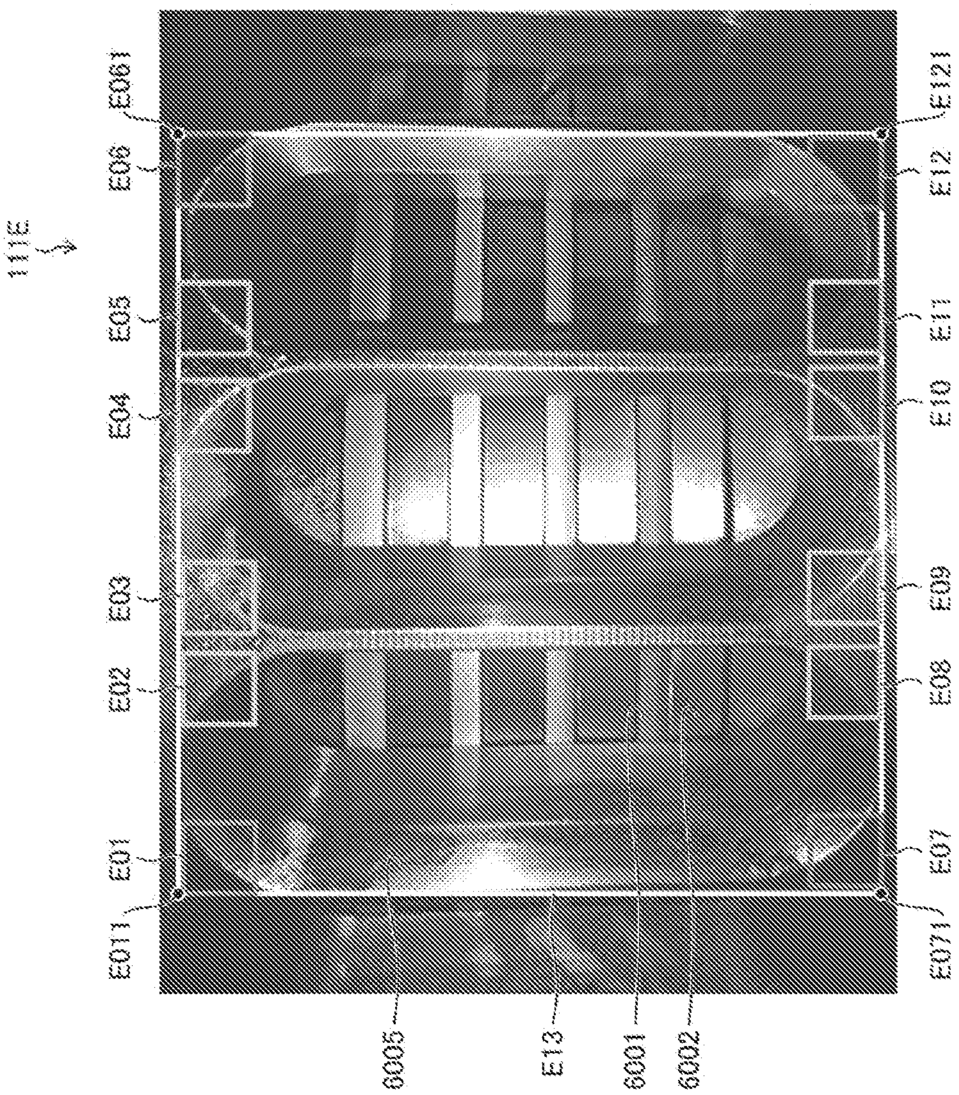
FIG. 11 is a view showing (i) a configuration of a piston crown, which is one example of an inspection target, and its surroundings and (ii) a captured image of the piston crown.
Figure 11:
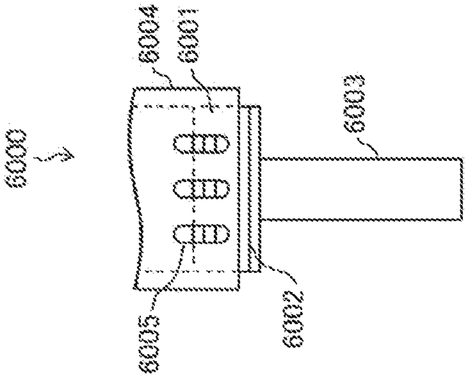

The description in the present embodiment will discuss, with reference to FIG. 11, an example in which the information processing device 1 inspects a state of an inspection target with use of an image captured by an optical camera. FIG. 11 is a view showing (i) a configuration of a piston crown 6001, which is one example of an inspection target, and its surroundings and (ii) a captured image 111E of the piston crown 6001.

The view 6000 in FIG. 11 shows a configuration of the piston crown 6001 and its surroundings. The piston crown 6001 is used in engines and the like. Shown in FIG. 11 is the piston crown 6001 for use in engines for ships. As shown in FIG. 11, the piston crown 6001 is provided to an end of a piston rod 6003. Further, the piston crown 6001 has a piston ring 6002 provided on a peripheral surface of the piston crown 6001. The piston crown 6001 moves in a reciprocating manner in a combustion chamber 6004 while the engine is running.

The combustion chamber 6004 has scavenging ports 6005 via which the air is taken into the combustion chamber 6004. Through the scavenging ports 6005, the piston crown 6001 can be partially observed. The image 111E is an image of the piston crown 6001 captured through the scavenging ports 6005.

The image 111E includes the scavenging ports 6005, the piston crown 6001, and the piston ring 6002. In order to inspect the piston crown 6001 with use of the image 111E, it is necessary to set a determination area including an image of the piston crown 6001. In the example shown in FIG. 11, four corners of each scavenging port 6005 included in the image 111E are detected as features and a determination area is set with reference to these features.

To be more specific, in FIG. 11, a detection result of the corners of the scavenging ports 6005 by the detecting section 101 are indicated by rectangles E01 to E12. In FIG. 11, the determination area set by the setting section 102 is indicated by a rectangle E13. The rectangle E13 is a rectangle defined by four apexes that are (i) an upper left apex E011 of the rectangle E01 detected at an upper left end, (ii) an upper right apex E061 of the rectangle E06 detected at an upper right end, (iii) a lower right apex E121 of the rectangle E12 detected at a lower right end, and (iv) a lower left apex E071 of the rectangle E07 detected at a lower left end.

Since the rectangle E12 includes the image of the piston crown 6001, the rectangle E12 is an appropriate determination area. The determining section 103 can determine, with respect to the determination area indicated by the rectangle E12, a state (e.g., an oil adhesion state, the presence or absence of a notched damage, and/or the like) of the piston crown 6001. In setting the determination area, the rectangles E02 to E05 and E08 to E11 may not be detected as features. In a case where the rectangles E01 to E12 are detected as features, a determination area may be set for each scavenging port 6005. That is, the setting section 102 may set a determination area with reference to the rectangles E01, E02, E07, and E08; the setting section 102 may set a determination area with reference to the rectangles E03, E04, E09, and E10; and the setting section 102 may set a determination area with reference to the rectangles E05, E06, E011, and E12.

As discussed above, the information processing device 1 is applicable also to an inspection involving use of an image captured by an optical camera. Further, as discussed above, the information processing device 1 may detect, as a feature, a matter which has a distinct appearance feature and is easy to be detected, among matters appearing in an area surrounding a determination area to be inspected in an image of an inspection target. This makes it possible to accurately detect the feature, and also makes it possible to set a determination area with high accuracy.

[Variations]

An entity that carries out each of the processes described in the foregoing embodiments can be changed as appropriate, and is not limited to those described in the foregoing examples. In other words, it is possible to construct an information processing system having the same functions as those of the information processing device 1 or 2, with use of a plurality of information processing devices capable of mutual communication. For example, in the method for setting the determination area shown in FIG. 7, the processes of S11 and S12, the process of S13, and the process of S14 may be executed by respective different information processing devices. That is, an entity that executes the method for setting the determination area may be a single information processing device 1 or a plurality of information processing devices. This is also true of the method for setting the determination area shown in FIG. 9.

Software Implementation Example

The functions of the information processing devices 1 and 2 (hereinafter, referred to as a "device") can be realized by a program (determination area setting program) causing a computer to function as the device, the program causing the computer to function as each of the control blocks (particularly, each of the sections included in the control section 10 or 20) of the device.

In this case, the above device includes, as hardware for executing the program, a computer including at least one control device (e.g., a processor) and at least one storage device (e.g., a memory). When the control device and the storage device executes the program, the functions explained in the foregoing embodiments are realized.

The program may be stored in one or more non-transitory, computer readable storage media. The one or more storage media may be or may not be included in the device. In the latter case, the program may be supplied to the device via any wired or wireless transmission medium.

A part of or all of the functions of the control blocks can be realized by a logical circuit. For example, an integrated circuit on which a logical circuit functioning the control blocks is formed may also be encompassed in the present invention. Alternatively, the functions of the control blocks can be realized by a quantum computer, for example.

The present invention is not limited to the embodiments, but can be altered by a skilled person in the art within the scope of the claims. The present invention also encompasses, in its technical scope, any embodiment derived by combining technical means disclosed in differing embodiments.

REFERENCE SIGNS LIST

1: information processing device
101: detecting section
102: setting section
111: image
112: detection model
2: information processing device
201: thickness determining section
202: setting section

The invention claimed is:

1. An information processing device comprising:
a detecting section that detects, in an image of an inspection target, a feature whose positional relation with a determination area to be inspected is known; and
a setting section that sets the determination area with reference to the feature detected by the detecting section,
wherein:
the image is a flaw detection image which is an image of echoes of ultrasonic waves caused to propagate in both (1) a weld part in the inspection target and (2) an area surrounding the weld part in the inspection target;
the detecting section is configured to detect, as the feature, a weld-side end portion of at least a first reflected echo among echoes of ultrasonic waves each reflected multiple times in the area surrounding the weld part in the inspection target, the weld-side end portion being at an end of the reflected echo adjacent the weld part.

2. The information processing device according to claim 1, wherein:
the detecting section detects the feature in the image with use of a detection model constructed by machine learning of an appearance of the feature; and
the detection model has been constructed by said machine learning to detect, as the feature, the weld-side end portion of at least the first reflected echo among the echoes of ultrasonic waves each reflected multiple times in the area surrounding the weld part in the inspection target.

3. The information processing device according to claim 1, wherein:
the setting section sets, with reference to said weld-side end portion of the first reflected echo detected by the detecting section, the determination area for use in determination of whether the weld part is good or defective.

4. The information processing device according to claim 3, further comprising:
a determining section that determines which of the inspection target and the weld part is thicker, wherein:

the detecting section also detects, as the feature, the second reflected echo among echoes of ultrasonic waves reflected in a surface of the area surrounding the weld part in the inspection target;

in a case where the determining section determines that a thickness of the inspection target is equal to or more than a thickness of the weld part, the setting section sets, as the determination area, an area sandwiched between the first reflected echo and the second reflected echo; and in a case where the determining section determines that the thickness of the inspection target is less than the thickness of the weld part, the setting section sets, with reference to the first reflected echo, the determination area having a width which is equal to or more than the thickness of the weld part.

5. The information processing device according to claim 3, wherein:

the flaw detection image is an image of the echoes measured in a state where a propagation inhibitor is disposed at a location adjacent to the weld part, the propagation inhibitor being configured to make at least one of transmission waves of the ultrasonic waves and reflected waves of the ultrasonic waves disappear or to delay propagation of at least one of the transmission waves of the ultrasonic waves and the reflected waves of the ultrasonic waves;

the detecting section detects, as the feature, an interrupted portion which is in the flaw detection image and in which propagation of the ultrasonic waves is interrupted; and the setting section sets the determination area with reference to the first reflected echo and the interrupted portion each of which has been detected by the detecting section.

6. The information processing device according to claim 5, wherein:

the detecting section detects the interrupted portion on a basis of intensities of echoes at respective positions in a belt-shaped area corresponding to a thickness of the inspection target.

7. A computer-readable non-transitory storage medium storing a determination area setting program causing a computer to function as an information processing device recited in claim 1, the determination area setting program causing the computer to function as the detecting section and the setting section.

8. A method for setting a determination area, the method being executed by one or more information processing devices, the method comprising the steps of:

(a) detecting, in an image of an inspection target, a feature whose positional relation with a determination area to be inspected is known; and (b) setting the determination area with reference to the feature detected in the step (a), wherein:

the image is a flaw detection image which is an image of echoes of ultrasonic waves caused to propagate in both (1) a weld part in the inspection target and (2) an area surrounding the weld part in the inspection target;

in the step (a), the one or more information processing devices detect, as the feature, a weld-side end portion of at least a first reflected echo among echoes of ultrasonic waves each reflected multiple times in the area surrounding the weld part in the inspection target, the weld-side end portion being at an end of the reflected echo adjacent the weld part.

9. The method according to claim 8, wherein:

the one or more information processing devices detect the feature in the image with use of a detection model constructed by machine learning of an appearance of the feature; and the detection model has been constructed by said machine learning to detect, as the feature, the weld-side end portion of at least the first reflected echo among the echoes of ultrasonic waves each reflected multiple times in the area surrounding the weld part in the inspection target.

* * * * *